United States Patent
Zondiner

(10) Patent No.: US 10,906,335 B2
(45) Date of Patent: Feb. 2, 2021

(54) SUCTION DEVICE

(71) Applicant: HP SCITEX LTD., Netanya (IL)

(72) Inventor: Ehud Zondiner, Netanya (IL)

(73) Assignee: HP SCITEX LTD., Netanya (IL)

( * ) Notice: Subject to any disclaimer, the term of this patent is extended or adjusted under 35 U.S.C. 154(b) by 0 days.

(21) Appl. No.: 16/539,013

(22) Filed: Aug. 13, 2019

(65) Prior Publication Data

US 2020/0062009 A1 Feb. 27, 2020

(30) Foreign Application Priority Data

Aug. 23, 2018 (EP) .................... 18190583

(51) Int. Cl.
*B41J 11/00* (2006.01)
*B41J 13/22* (2006.01)
*B25J 15/06* (2006.01)

(52) U.S. Cl.
CPC ....... *B41J 11/0085* (2013.01); *B25J 15/0616* (2013.01); *B41J 13/226* (2013.01); *B65H 2406/351* (2013.01); *B65H 2406/3632* (2013.01)

(58) Field of Classification Search
CPC .. B41J 2/16585; B41J 2/1752; B41J 2/17523; B41J 2/1753; B41J 29/02; B41J 29/54; B41J 2/175
See application file for complete search history.

(56) References Cited

U.S. PATENT DOCUMENTS

| | | | |
|---|---|---|---|
| 3,460,822 A | 8/1969 | Link | |
| 3,720,433 A | 3/1973 | Rosfelder | |
| 6,092,894 A | 7/2000 | Nuita et al. | |
| 6,254,092 B1 * | 7/2001 | Yraceburu | B41J 11/007 271/197 |
| 6,357,869 B1 | 3/2002 | Rasmussen et al. | |
| 6,371,430 B1 | 4/2002 | Vernackt | |
| 8,033,624 B2 | 10/2011 | Silva et al. | |
| 8,042,799 B2 | 10/2011 | Clark | |
| 8,066,368 B2 | 11/2011 | Maekawa et al. | |
| 9,290,018 B1 * | 3/2016 | Vandagriff | B41J 15/04 |
| 9,427,986 B2 | 8/2016 | Furukawa | |
| 2006/0261536 A1 | 11/2006 | Dangelewicz et al. | |
| 2010/0239408 A1 | 9/2010 | Becker et al. | |
| 2012/0193500 A1 | 8/2012 | Kniss et al. | |
| 2014/0240423 A1 * | 8/2014 | Cressman | B41J 11/007 347/104 |
| 2016/0258472 A1 | 9/2016 | Perlman et al. | |

FOREIGN PATENT DOCUMENTS

WO WO-2018074987 A1 4/2018

* cited by examiner

*Primary Examiner* — Lamson D Nguyen
(74) *Attorney, Agent, or Firm* — Steven R. Ormiston

(57) ABSTRACT

According to examples, there is provided a suction device, system and method for retaining media on a surface. The suction device comprising a suction cup having a vacuum port for coupling the suction cup to a vacuum source, a sealing piston configured to seal the vacuum port when the sealing piston is in a first position, wherein when the sealing piston is in a second, depressed, position the vacuum source is coupled to the suction cup the sealing piston further comprising a piston head extending above a rim of the suction cup when the sealing piston is in the first position, and a biasing element to bias the sealing piston to the first position.

13 Claims, 4 Drawing Sheets

SUCTION DEVICE

BACKGROUND

In some media handling apparatus, such as printers, media stackers or the like, media conveyors such as belt-type conveyors, rollers or pallets on an endless track may be used to convey media, for example print media onto which text or an image may be printed. For example, such media conveyors may be used to convey media from a media storage area to a position in which it can be printed (for example, near a printhead of the printer of the like) and then to convey the printed media to a curing and/or collection area.

BRIEF INTRODUCTION OF THE DRAWINGS

Various features of the present disclosure will be apparent from the detailed description which follows, taken in conjunction with the accompanying drawings, which together illustrate features of the present disclosure, and wherein.

DETAILED DESCRIPTION

Figure 1:
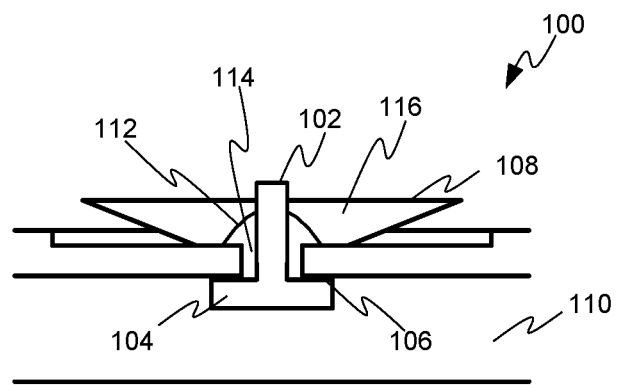
FIG. 1 shows a suction device according to an example of the disclosure.

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

Media conveyors may be used to move media, for example a sheet media such as paper, card stock, and the like. For example, a media conveyor may be provided in a print apparatus to transport a print medium through the print apparatus when printing an image to the print medium.

In order to securely hold the sheet media to the media conveyor, suction may be used. For example, the media conveyor may include a vacuum table or belt that is perforated to allow suction of air from an upper surface to a vacuum chamber located underneath.

In such arrangements, the vacuum force applied to a medium on the media conveyor is equal to the total vacuum hole area of the perforations multiplied by the vacuum pressure. In order to increase the vacuum force, the perforations may be enlarged to increase the vacuum hole area. However, as some holes may often be left uncovered by the medium, enlarging the vacuum holes may lead to significantly reduced vacuum pressure in the vacuum chamber, which may lead to a more powerful vacuum source being specified and may result in increased energy costs.

In order to ensure that a sufficient vacuum force is efficiently applied to a medium, a user may limit the sheet media used to a size which covers all of the vacuum holes on the surface of the media conveyor, or may attempt to manually cover the unused vacuum holes, for example using tape. A further approach may be to provide a zoned media conveyor in which the vacuum holes are split into sections associated with different vacuum chambers/sources. Selection of a subset of zones may then allow the provided suction to be tailored to a particular substrate size. However, these approaches are generally time consuming, inflexible and may use a high vacuum level to be provided to compensate for losses in the system.

To provide an increased holding force without increasing the size of the vacuum holes, a suction cup arrangement has been developed, whereby each vacuum hole is associated with a larger suction cup that contacts the sheet medium. By applying the vacuum pressure over a larger area of the sheet media inside the circumference of the suction cup, the holding force associated with each suction hole is increased for a same vacuum pressure, while the size of the vacuum hole itself can be maintained.

However, the vacuum hole associated with suction cups that are not covered by a sheet medium in operation will still lead to pressure losses and reduce the efficiency of the media conveyor.

Certain examples described herein provide methods and apparatus for selectively coupling a vacuum source to a suction cup in the presence of a medium to provide a holding force to secure the medium in place while avoiding inefficiencies associated with vacuum losses though uncovered vacuum holes. For example, according to some examples, there is provided a self-activating suction cup that automatically seals a vacuum hole in the absence or a sheet medium covering the suction cup, and then when a sheet medium is brought into contact with a rim of the suction cup opens the vacuum hole to allow fluid communication with a source of vacuum pressure.

FIG. 1 illustrates a suction device 100 according to an example of the disclosure. The suction device 100 includes a vacuum hole 114 to allow fluid communication between a top surface of the suction device 100 and a source of vacuum pressure, such as a vacuum chamber 110. A suction cup 116 having a rim 108 is positioned on the top surface of the suction device and is associated with the vacuum hole 114. A sealing piston 104 is located within the vacuum hole and comprises a piston head 102 that extends above the rim 108 of the suction cup. A spring element 112 is coupled to the sealing piston 104 and biases the sealing piston 104 against a sealing area 106 located around the vacuum hole to isolate the suction cup 116 from the vacuum chamber 110. The sealing piston 104 may be provided with a sealing surface arranged to engage with the sealing area 106 in a closed position.

Figure 2:
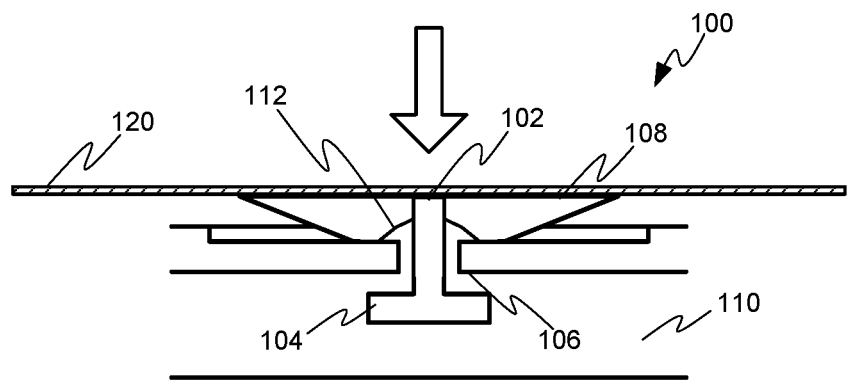
FIG. 2 shows a substrate contacting the suction device of FIG. 1 according to an example of the disclosure.

FIG. 2 illustrates the suction device 100 when a substrate 120, such as a print medium, is brought into contact with the rim 108 of the suction cup 116. When the sealing piston 104 is in the closed position, the piston head 102 extends above the rim 108 of the suction cup 116. Therefore, as the substrate 120 comes into contact with the rim 108, it also engages the piston head 102 and depresses the sealing piston 104 into an open position. As the sealing piston 104 moves into the open position, the suction cup comes into fluid communication with the vacuum chamber 110 and the vacuum pressure is applied within the suction cup. This results in a suction force being applied to the medium by the suction cup 116 that has a magnitude determined by the vacuum pressure acting over the area within the rim 108 of the suction cup 116 in contact with the print medium 120.

The spring element 112 is selected to provide a biasing force ($f_s$) that is greater than the vacuum force ($f_v$) generated in operation by the vacuum pressure (V) in the vacuum chamber 110 acting on the area (a) of the sealing piston 104. This means that the spring element 112 provides sufficient force to maintain the sealing piston 104 in a closed position when the vacuum pressure is applied to the vacuum chamber 110 i.e. for:

$$f_v = V \times a;$$

$$f_s > f_v$$

Furthermore, the biasing force (fs) of the spring element 112 may be selected to be less than the force (F) applied to the print medium by the vacuum pressure (V) acting over the area (A) within the rim 108 of the suction cup 116 in contact with the print medium 120, i.e. for:

$$F = V \times A;$$

$$F > f_s$$

Thus, once the substrate 120 has been brought into contact with the rim 108 of the suction cup 116, and the vacuum pressure of the vacuum chamber 110 has been coupled to the interior of the suction cup 116, the force applied to the substrate 120 is sufficient to overcome the biasing force of the spring element 112 and thereby maintain the sealing piston 104 in the open position.

Figure 3:
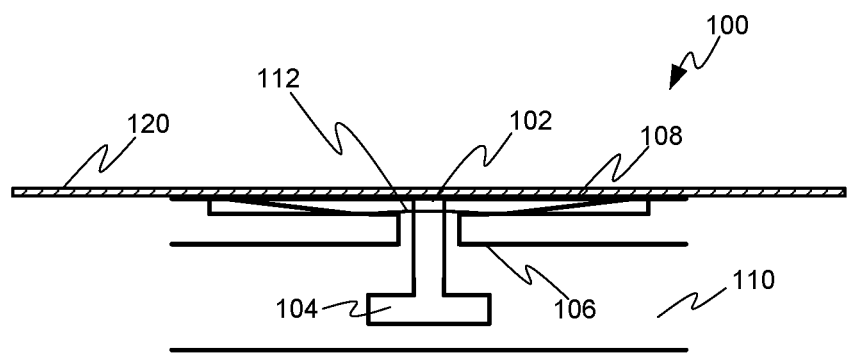
FIG. 3 shows a suction device fully engaged with a substrate according to an example of the disclosure.

FIG. 3 illustrates the suction device 100 in a further configuration in which the suction cup 116 is compressed level with a top surface of a support substrate to provide a retaining force to the substrate 120 while holding the substrate 120 flat. For example, suction cup may be fabricated from an elastically deformable material such that the suction force (F) applied to the substrate in the configuration of the suction device 100 illustrated in FIG. 2 is sufficient to deform the suction cup 116 walls into recesses in the top surface of the support substrate to provide the level surface.

When it is desired to release the substrate 120 from the suction cup the vacuum pressure may be reduced, for example by switching off or isolating a vacuum source from the vacuum chamber 110. The biasing force provided by the spring element 112 may then raise the substrate 120 above the rim 108 of the suction cup 116, biasing the sealing piston 104 against the sealing surface 106 and isolating the suction cup 116 from the vacuum chamber 110.

Figure 4A:
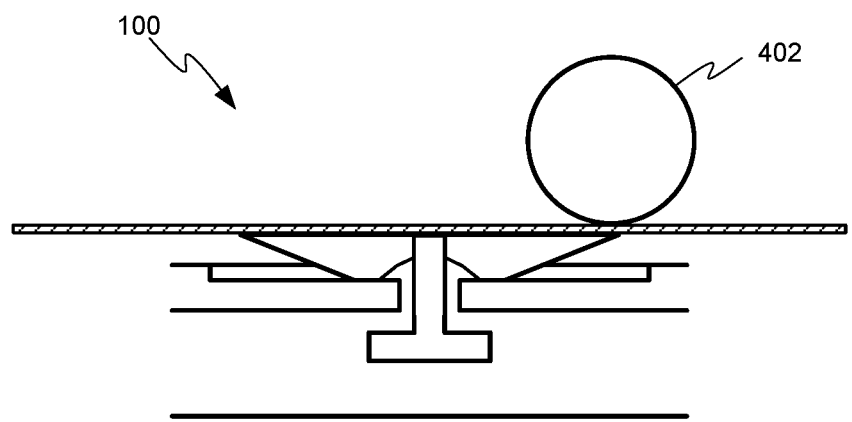
FIG. 4a-4c shows example positioning devices for positioning a substrate on a suction device according to an example of the disclosure.
Figure 4B:
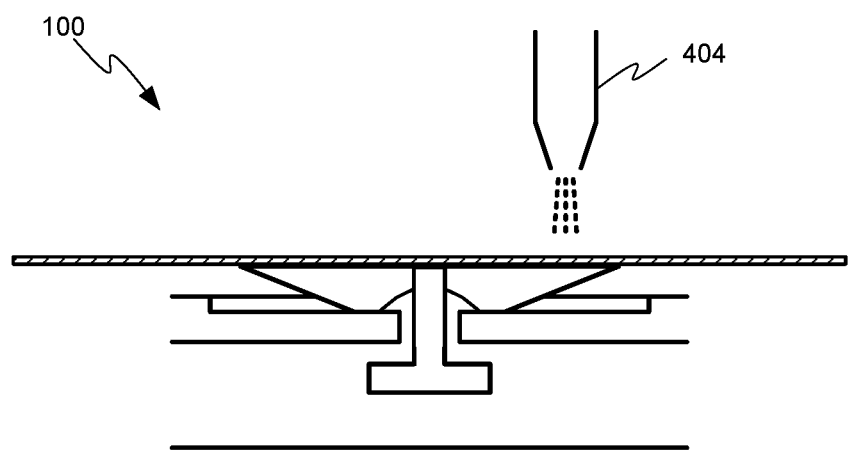
Figure 4C:
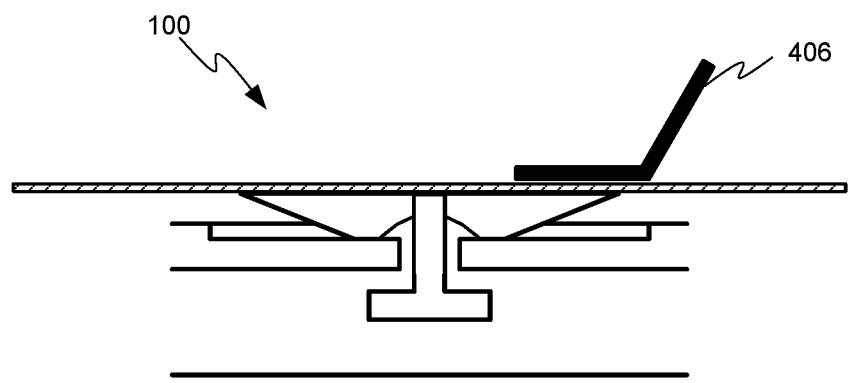

In order to bring the substrate 114 into contact with the rim 108 of the suction cup 116, and overcome the biasing force applied to the sealing piston 104 by the spring element 112, a positioning device may be provided. FIGS. 4a to 4c illustrate a number of example positioning devices that could be used. FIG. 4a illustrates the use of a roller 402 to press the substrate 114 against the suction cup 116; FIG. 4b illustrates the use of air jet device 404; and FIG. 4c illustrates an inlet bracket 406.

Spring element 112 may be implemented as any suitable element capable of providing the desired biasing force. For example, the spring element 112 may take the form of a leaf/wire mechanism, a spiral spring mechanism, an integral elastic element mechanism, an elastic cylinder mechanism, or any other suitable mechanism.

Figure 5:
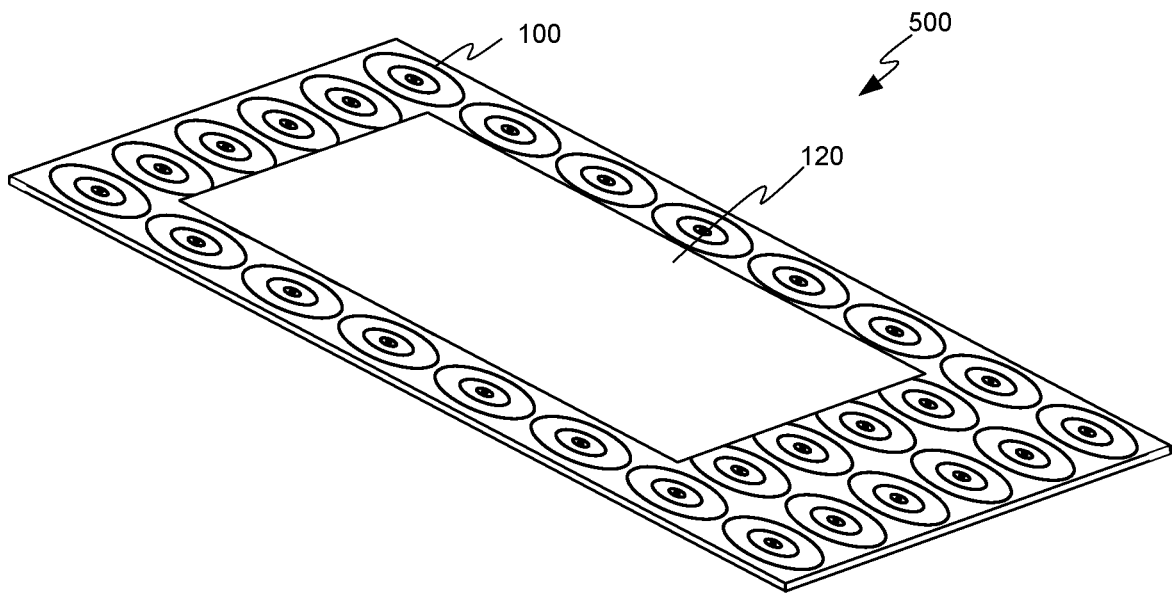
FIG. 5 shows a media support platform including a plurality of suction devices according to an example of the disclosure.

FIG. 5 illustrates a media conveyor 500, or media support platform, including a plurality of suction devices 100 according to the above described examples. The media conveyor 500 may include a vacuum chamber underlying the plurality of suction devices 100 that can be selectively coupled to the suction cups of the plurality of suction devices in the presence of a substrate 114 as described above. In some examples, the media support platform 500 may be a vacuum table or a vacuum belt.

As shown in FIG. 5, a substrate 120 may cover a subset of the plurality of suction devices 100 on the surface of the media conveyor 500. Suction devices 100 covered by the substrate 120 will automatically be activated by the action of the substrate 120 pressing down on the piston head 102 of each suction device 100. In contrast, the sealing pistons of the uncovered suction devices will remain in the closed position, isolating the associated suction cups from the vacuum source.

Thus, the example media conveyor 500 of FIG. 5 is operable to automatically enable the suction devices 100 to provide a suction force to any size of substrate 120, or print media, while avoiding vacuum losses by sealing uncovered vacuum holes.

Figure 6:
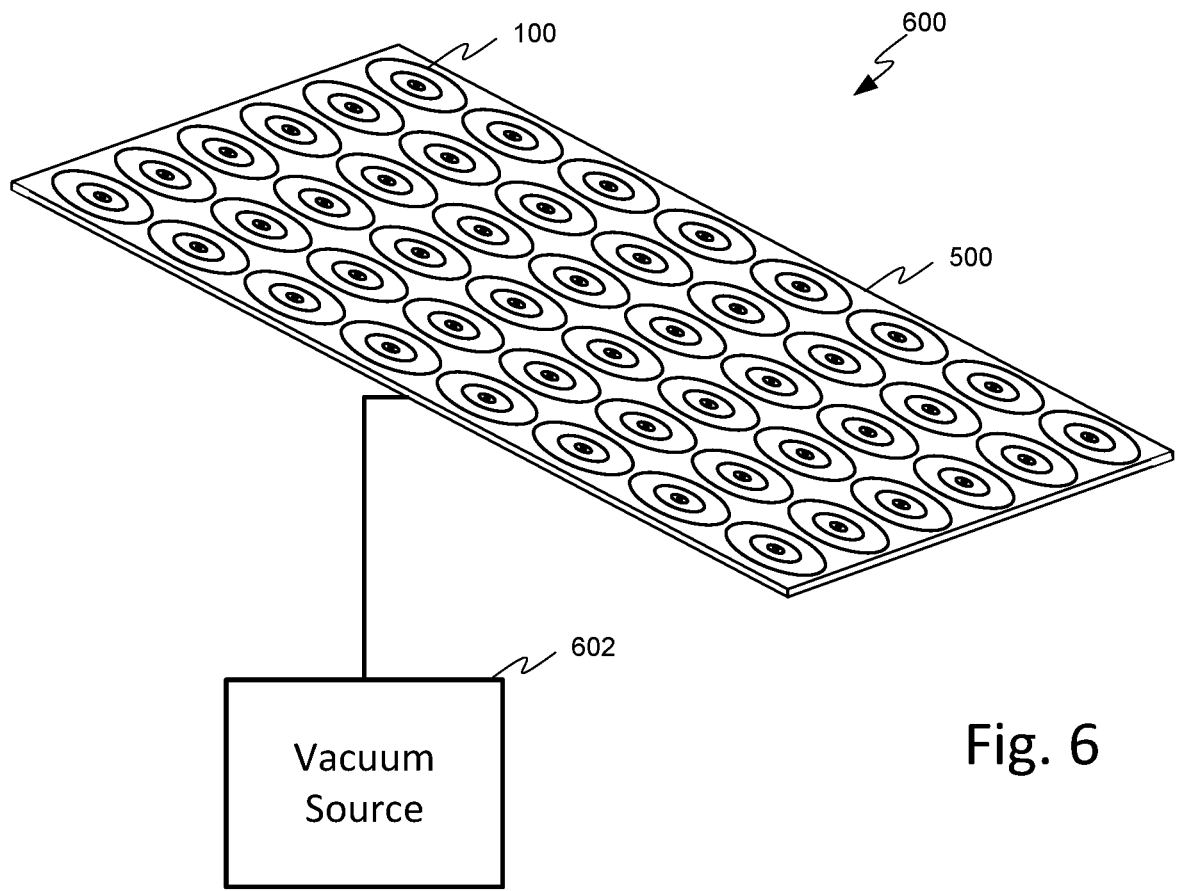
FIG. 6 shows a system including the media support platform of FIG. 5 according to an example of the disclosure.

FIG. 6 illustrates a system 600 according to some examples, such a print apparatus, incorporating the media conveyor 500 of FIG. 5. The system of FIG. 6 further includes a vacuum source 602, such as a pump device, in fluid communication with the vacuum chamber of the media conveyor 500 to provide the vacuum pressure in operation.

System 600 may further include a positioning device, such as illustrated in FIGS. 4a to 4c to position the substrate 120 on the media support platform in contact with a rim 108 of at least one suction cup 116, so as to cause the sealing piston 104 associated with that suction cup 116 to be depressed, coupling the vacuum chamber to the suction cup.

Figure 7:
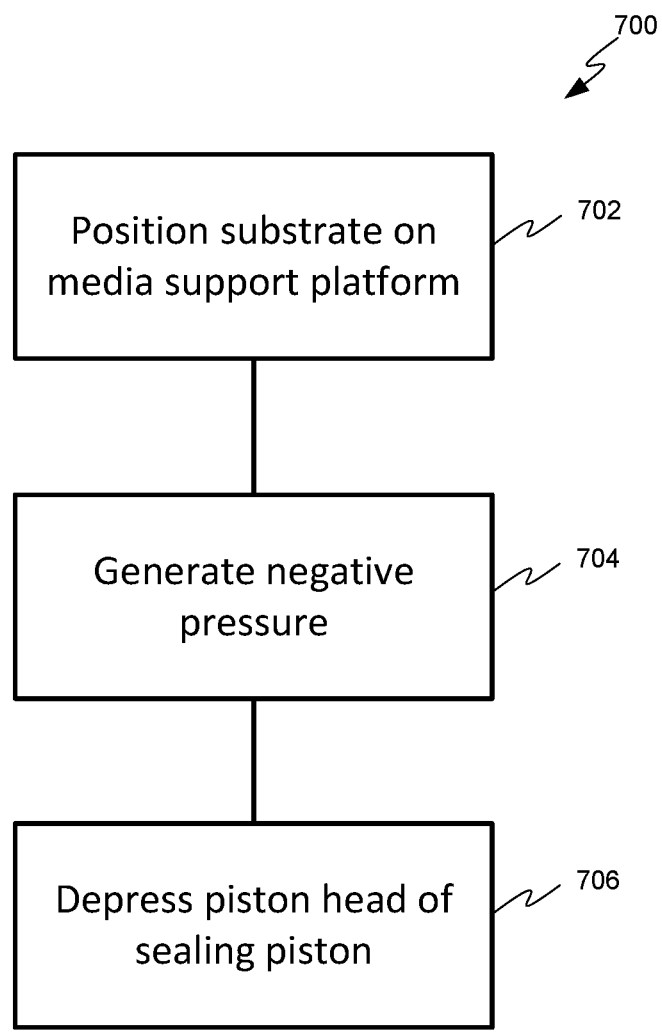
FIG. 7 shows a method according to an example of the disclosure.

FIG. 7 illustrates a method 700 according to some examples of the disclosure. According to the method 700 of FIG. 7, a substrate 120, such as a print medium, is positioned 702 on a media support platform 500, such as described above, in contact with a rim of a suction device 100 of the media support platform 500. A negative pressure, or vacuum, is then generated 704, for example using a vacuum pump, and communicated to a vacuum chamber of the media support platform 500. In response to the presence of the substrate on the media support platform 500, a piston head 102 of a sealing piston 104 of the suction device 100 is depressed, moving the sealing piston 104 to an open position and causing the generated negative pressure to be communicated to the interior of the suction cup 116 to hold the substrate 120 in position on the media support belt.

Generally, for example as illustrated in FIG. 5, the substrate 120 will come into contact with multiple suction devices 100 of the media support platform 500, and therefore a subset of the plurality of suction devices comprising two or more will be activated as described above.

The positioning of the substrate 120 may involve a positioning device configured to apply a force to the surface of the substrate 120 to cause the substrate to engage at least one piston head 102 of a sealing piston 104 associated with the suction device 100 of the media support platform 500. In particular, the applied force may be of sufficient magnitude to cause the sealing piston to be depressed against the action of a biasing element 112 or spring that is operable to hold the sealing piston in a closed position under normal conditions.

Once the substrate 120 is securely held on the media support platform 500, it may then be conveyed into a desired position, for example through a printing process, while retained in position on the platform.

All of the features disclosed in this specification (including any accompanying claims, abstract, and drawings) may be combined in any combination, except combinations where some of such features are mutually exclusive. Each feature disclosed in this specification, including any accompanying claims, abstract, and drawings), may be replaced by alternative features serving the same, equivalent, or similar purpose, unless expressly stated otherwise. Thus, unless expressly stated otherwise, each feature disclosed is one example of a generic series of equivalent or similar features.

The present teachings are not restricted to the details of any foregoing examples. Any novel combination of the features disclosed in this specification (including any accompanying claims, abstract, and drawings) may be envisaged. The claims should not be construed to cover merely the foregoing examples, but also any variants which fall within the scope of the claims.

The invention claimed is:

1. A suction device for retaining media on a surface, the device comprising:
   a suction cup having a vacuum port for coupling the suction cup to a vacuum source;
   a sealing piston configured to seal the vacuum port when the sealing piston is in a first position, wherein when the sealing piston is in a second, depressed, position the vacuum source is coupled to the suction cup;
   the sealing piston further comprising a piston head extending above a rim of the suction cup when the sealing piston is in the first position; and
   a biasing element to bias the sealing piston to the first position.

2. The suction device of claim 1, wherein a biasing force of the biasing element is configured to be greater than a first vacuum force exerted on the piston by the vacuum source but less than a second vacuum force exerted on a substrate in contact with the rim of the suction cup when the sealing piston is in the second position.

3. The suction device of claim 1, wherein the piston head is arranged to cause the sealing piston to move to the second position when a substrate positioned to contact the rim of the suction cup engages with the piston head.

4. The suction device of claim 1, wherein the biasing element comprises one of:
   a leaf/wire mechanism;
   a spiral spring mechanism;
   an integral elasticity mechanism; and
   an elastic cylinder mechanism.

5. The suction device of claim 1, wherein the sealing piston comprises a sealing surface configured to engage with a sealing area of the vacuum port when the piston is in the first position.

6. A printing system comprising:
   a vacuum source; and
   a media support platform comprising a plurality of suction devices, at least one suction device of the plurality of suction devices comprising:
      a suction cup having a vacuum port for coupling the suction cup to the vacuum source;
      a sealing piston configured to seal the vacuum port when the sealing piston is in a first position, wherein when the sealing piston is in a second, depressed, position the vacuum source is coupled to the suction cup,
      the sealing piston further comprising a piston head extending above a rim of the suction cup when the sealing piston is in the first position; and
      a biasing element to bias the sealing piston to the first position.

7. The printing system of claim 6, the printing system further comprising a positioning device configured to position a substrate on the media support platform in contact with a rim of at least one suction cup of the plurality of devices.

8. The printing system of claim 7, wherein the positioning device comprises at least one of: a roller, an air-jet and an inlet bracket to force the substrate to contact the rim of the at least one suction cup.

9. The printing system of claim 6, wherein the media support platform comprises a vacuum table or belt.

10. The printing system of claim 6, wherein the media support platform further comprises a vacuum chamber coupled to each of the plurality of suction devices via a respective vacuum port.

11. The printing system of claim 6, wherein the biasing element is configured to have a biasing force greater than a first vacuum force exerted on the piston by the vacuum source but less than a second vacuum force exerted on a substrate in contact with the rim of the suction cup when the sealing piston is in the second position.

12. A media support, comprising:
   a vacuum source; and
   a media support platform comprising a plurality of suction devices, at least one suction device of the plurality of suction devices comprising:
      a suction cup having a vacuum port for coupling the suction cup to the vacuum source;
      a sealing piston configured to seal the vacuum port when the sealing piston is in a first position, wherein when the sealing piston is in a second, depressed, position the vacuum source is coupled to the suction cup,
      the sealing piston further comprising a piston head extending above a rim of the suction cup when the sealing piston is in the first position; and
      a biasing element to bias the sealing piston to the first position; and
   a positioning device configured to press a substrate on the media support against the piston head with sufficient force to overcome the bias and depress the sealing piston from the first position toward the second position.

13. The media support of claim 12, wherein the biasing element is configured to have a biasing force greater than a first vacuum force exerted on the piston by the vacuum source but less than a second vacuum force exerted on a substrate in contact with the rim of the suction cup when the sealing piston is in the second position.

* * * * *